United States Patent Office 3,064,329
Patented Nov. 20, 1962

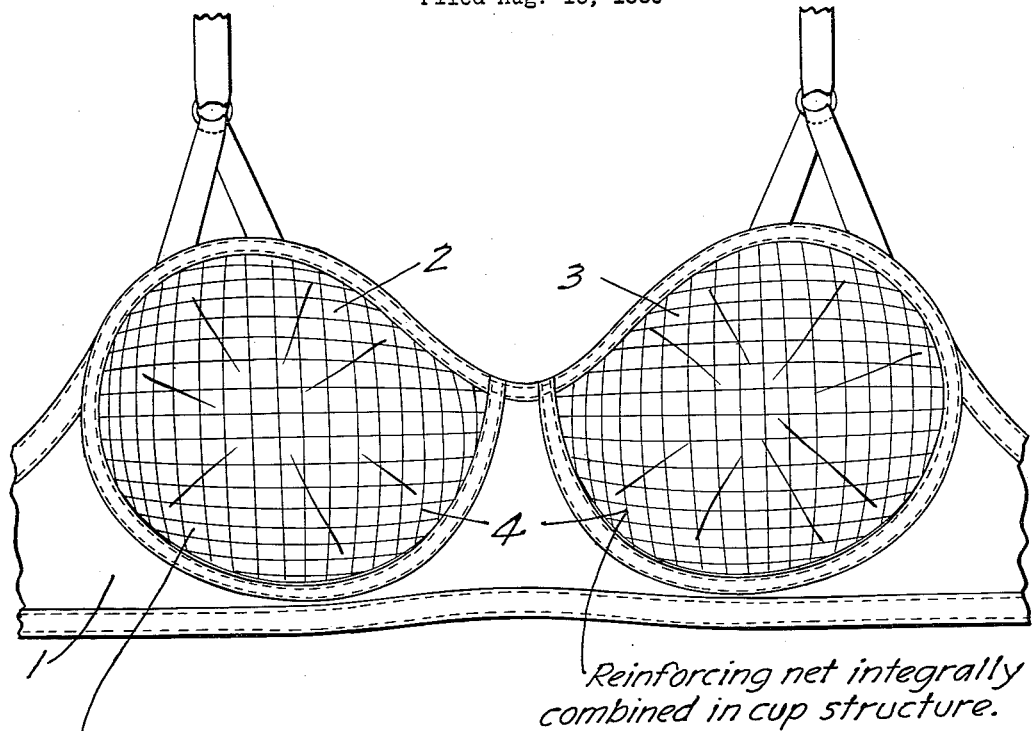

3,064,329
MOLDED NONWOVEN FABRIC ARTICLES
Walter M. Westberg, St. Paul, and Patrick H. Carey, Jr., Bloomington, Minn., assignors to Minnesota Mining and Manufacturing Company, St. Paul, Minn., a corporation of Delaware
Filed Aug. 19, 1959, Ser. No. 834,799
8 Claims. (Cl. 28—74)

This invention relates to new and useful molded nonwoven fabric articles, and to the process of making. It has particularly noteworthy value in the manufacture of shaped articles of wearing apparel, such as brassiere cups.

The product is formed by molding to a precise predetermined shape a fluffy carded web sheet of initially unbonded interlaced mixed staple fibers which includes undrawn (amorphous) polyester fibers as thermoplastic binder fibers; the molded sheet being compacted and unified into its stable final shape by heating and soft-pressing which also effects mutual autogenous interbonding of the interlaced thermoplastic polyester fibers at their crossing-points so as to provide a fiber-unifying and shape-retaining network. These amorphous polyester fibers are rendered crystalline and nontacky during the heating operation.

This molding operation is preferably performed by shaping the fluffy fibrous sheet over a heated male mold and then uniformly pressing and compacting the sheet against the mold by use of a non-adhering stretchy rubbery blanket, thereby simultaneously heating the web to the requisite extent, after which the molded sheet (which is rendered non-adherent during the molding operation) is immediately lifted from the heated mold without need for cooling. A conformable open-mesh net or gauze can if desired be integrally incorporated, by application over the fibrous sheet on the mold prior to the pressing step, thereby providing reinforcement or a desired appearance effect.

All fibers throughout the structure are then coated by impregnating with a waterproof resilient polymer latex size which interbonds all the fibers at their crossing points and imparts the desired body and other physical properties to the complete article, but without materially reducing its porosity. The product is normally subjected to finishing treatments such as washing, bleaching and trimming, to prepare the final article for use or sale.

The materials and proportions used in manufacturing the shaped brassiere cup product are selected so that it is highly porous, strong and tough, shape-retaining but flexible, non-irritating to the skin, and capable of repeated laundering; as more fully explained hereinafter.

The accompanying diagrammatic drawing illustrates the invention as applied to the manufacture of a brassiere 1 having a pair of breast cups 2 and 3 sewn into the harness; these cups having been molded from nonwoven carded sheets of interlaced staple fibers in the manner briefly indicated above, and each having a net 4 integrally combined in the surface structure as a reinforcement and to enhance appearance.

Seamless shaped articles of this invention can be fabricated so as to embody a combination of features which render them eminently suitable for wearing apparel usage. They are highly porous and breathable so as to permit of the ready passage of air and moisture; and they are moisture absorptive; resulting in comfort even when worn next to the skin and in hot or humid weather. They do not abrade or irritate the skin even upon prolonged contact and do not cause dermatitic or allergic reactions. There is no seam to add bulk and detract from appearance or cause discomfort. They feel soft and comfortable against the skin. They have sufficient body, strength and resilience to hold their shape, and to provide comfortable contour control and support as in the case of brassiere breast cups. They can be easily trimmed and readily and durably sewed to associative woven fabric elements as in manufacturing complete brassieres. They are durable and the initial shape is permanent; the articles not becoming stretched out, limp, distorted, wrinkled, ragged or sleazy in continued use or on account of repeated laundering or dry cleaning. They are initially of attractive appearance and are easily kept clean and fresh looking by home laundering; and they dry rapidly without wrinkling or cockling and need no ironing.

The importance of this invention does not reside merely in the technical and utility merits of the products, critical as these may be to user acceptance and satisfaction. Equally important is the fat that these articles can be manufactured at a low cost. No weaving or knitting is required at any stage. There is no cutting and sewing as is required in making conventional brassiere cups. A high degree of predetermined shape precision and uniformity are obtainable and on a mass production basis. Such uniformity is desirable in the manufacture of brassiere cups; so that anyone who buys brassieres of a given style, size and make can depend upon them to have the same fit and feel. Such uniformity is not obtainable when cups are made by cutting and sewing cloth; particularly so in respect to inexpensive mass-produced cups. The complete process of manufacture from fibers to product is inherently simple and lends itself to high speed production. Although the resultant savings in labor costs and equipment charges make inexpensive manufacture possible, the products are not shoddy substitutes but are fit for use in producing quality merchandise. Thus brassiere cups of the present invention can be employed by brassiere manufacturers in producing a new and superior type of product at a lower cost.

Recognition of the desirability of producing seamless three-dimensional wearing apparel articles, especially brassiere cups, by some process of shaping or molding a flat fibrous fabric or web, goes back many years and a substantial number of patents have described a wide variety of proposals. These mostly involved use of special types of woven or knitted fabrics although non-woven staple-fiber fabrics have also been suggested for products in this general category, including brassiere cups. Thus see, for instance, U.S. Patents Nos. 2,047,230 (1936), 2,190,545 (1940), 2,190,807 (1940), 2,285,967 (1942), 2,460,674 (1949), 2,580,566 (1952), 2,609,539 (1952), 2,616,084 (1952), 2,760,198 (1956).

However, to the best of our knowledge and belief, none of these prior proposals led to any substantial commercial manufacture or use of seamless shaped brassiere cups. Brassiere manufacturers have continued to mainly utilize cups formed by cutting and sewing woven fabrics, despite the disadvantages of seams and the relatively high labor costs involved.

Brassiere cups produced according to the present invention have been embodied in complete brassieres which have been sufficiently tested and evaluated to indicate commercial value as a satisfactory and economical replacement for conventional brassieres, and to verify the value of advantageous features attributable to the novel cups. The evaluations included usage by a large number of women who subjected their test brassieres to daily washing and wearing for continuous periods of 30 days or more, demonstrating a satisfactory wash-and-wear life.

The particular types of materials utilized in fabricating the washable wearing apparel products of this invention are of critical importance in respect to successful low-cost manufacturing operations as well as in respect to the combination of characteristics achieved in the end product.

An end product might be similar from the standpoint of the user but not lend itself to manufacture at a comparable cost. Both considerations were involved in the empirical discovery, after much experimentation, of the particular combination of materials that is used. These types of materials were individually old and commercially available (along with a great variety of other fibers and fiber-sizing agents which are non-equivalent for present usage), but so far as we are aware there was no prior suggestion of their conjoint selection and use for any purpose.

These types of fabrication materials as preferably employed in combination in manufacturing brassiere cups and other articles of wearing apparel, are exemplified by:

(A) Unplasticized polyester staple fibers of the conventional drawn and oriented type employed in the textile industry, and having a length in the range of approximately 1 to 2 inches. These are manufactured by melting and extruding through spinnerets a high molecular weight polyester of a dihydric alcohol and a dicarboxylic acid. The extruded filaments are elongated by drawing (stretching) which brings about an oriented crystalline molecular structure, decreased diameter and denier value, increased tensile strength and elasticity, decreased stretchability, and elimination of a broad softening temperature range in favor of an elevated melting point (actually a narrow temperature range within which the drawn fibers soften and melt). The endless filaments are chopped to produce the staple fibers. Drawn polyester fibers are sold by the Du Pont Company under the trademark "Dacron," and are understood to be made from a polyester of ethylene glycol and terephthalic acid.

(B) Unplasticized thermoplastic polyester staple fibers of the undrawn and amorphous type, having a length in the range of approximately 1 to 2 inches. These are manufactured in the same way as the above-mentioned drawn fibers except that the drawing operation is omitted, thereby avoiding the mentioned changes. These fibers have an inherent wide softening temperature range below the temperature at which they fluidify or melt, within which the thermosoftened fibers can be autogenously interbonded at crossing points by application of light pressure without cutting or mashing the fibers, the fiber identities thus being retained. No plasticizer is needed to obtain this thermobonding property. When heated in this range these fibers acquire a crystalline structure, become stiffer, become nonadherent to a heated metal mold, and the softening temperature is elevated. This initial softening temperature range is below the narrow melting point range of the corresponding crystalline drawn fibers. For instance, fibers chopped from the undrawn polyester filaments produced intermediately in the manufacture of "Dacron" fibers, have a thermobonding softening temperature range of approximately 200 to 450° F. (90 to 230° C.), whereas the regular "Dacron" drawn type of fibers of the same chemical composition have a melting point of approximately 480° F. (240° C.) and are not soft and capable of autogenous interbonding with each other in the 200 to 450° F. range.

(C) Cellulose staple fibers having a length of approximately 1 to 2 inches. These are preferably viscose-rayon fibers but use can also be made of long-staple cotton or ramie fibers.

These three types of fibers are intermixed and all serve as structural fibers. The polyester fibers of undrawn type (B) also function as thermoplastic binder fibers, and are employed in a proportion of about 30 to 50% by weight. The cellulose fibers are employed in a proportion roughly equal thereto, such that the total proportion of both is about 70 to 90%. The drawn polyester fibers are employed in a minor proportion (about 10 to 30%).

A carded mixture of the above-described three types of fibers provides the dry fluffy fibrous web or bat which is molded and autogenously unified (by heating and soft-pressing) in accordance with the present invention, prior to impregnation with the aqueous sizing dispersion. The fibers of the heterogenous mixture extend every which way and are interlaced, crossing over and under each other in a random manner, such that each fiber of given type crosses numerous fibers of the other two types as well as numerous fibers of the same type. These relatively long fibers contact each other only at their crossing points. A high ratio of the fiber surface areas is available for subsequent coating and maximum porosity is achieved. The unbonded web is stretchable and can be shaped on a heated male mold without disruption or wrinkling so as to effect a deep drawing to a precise shape, owing to the length and the initially unbonded interrelationship of the fibers which permit of fiber displacements to obtain conformation but which minimize and localize the fiber motions and disturbances. Heating and soft pressing of the molded fiber web results in compaction and unification; the undrawn (amorphous) polyester binder fibers becoming outogenously interbonded at their mutual crossing points (fusing together at a temperature at which they are soft and mutually cohesive) and then hardening and stiffening without shrinking, to provide a fiber-unifying and shape-retaining network that unifies and stabilizes the shaped structure and does not stick to the heated mold. The other two types of fibers are not mutually interbonded, and are only lightly bonded if at all at the points at which they cross the undrawn polyester fibers, being held in place mainly by mechanical restraint. The thus unified molded article holds its shape so that it can be removed from the nonadhering mold while still warm, and can be saturated with an aqueous latex dispersion and dried, without becoming distorted.

(D) An aqueous dispersion of a fiber-sizing latex, which is used to impregnate the molded product so as to bind the fibers together and impart strength and shape-retention to the final article. An aqueous carboxylic acrylate polymer latex dispersion containing a small proportion of a curing agent is preferred in manufacturing washable wearing apparel articles, such as brassiere cups. This latex dispersion is used for saturating the molded and autogenously unified fibrous web so as to size coat the fibers and interbond them at their crossing points, and produce a product of the type previously described which is porous, tough, durable and launderable. A functionally equivalent polymer coating dispersion can be used, the purpose being to impart certain physical properties to the product; the particular chemical composition not being critical per se. The carboxylic acrylate polymer is a soft, elastic and slightly tacky copolymer made by copolymerizing a lower-alkyl acrylate ester monomer (preferably in the ethyl, propyl, butyl range) with a small proportion of acrylic or methacrylic acid monomer (or equivalent carboxylic acid monomer) so as to incorporate a small proportion of carboxylic side groups into the acrylate polymer molecule and thereby enhance the adhesive binding action but without rendering the copolymer highly tacky. An emulsion polymerization procedure is used so as to provide an aqueous latex dispersion, which can be diluted with water to provide the desired solids concentration for treatment of the web. A coagulated dried mass of the uncured polymer is soft and slightly tacky and has an elastic snap. A commercially available carboxylic acrylate polymer latex dispersion of this type is the "HA-1" dispersion sold by Rohm & Haas Company.

A water-soluble cyclic urea-formaldehyde type curing agent is preferred when the aforesaid carboxylic acrylate polymer latex is employed. It is inactive in the aqueous dispersion, which is stable, but upon drying and heating of the treated article the carbonyl-containing ring structure of the molecule opens so that it becomes reactive and the compound then functions to cure ("vulcanize") the polymer coatings, presumably by providing cross-linking between carboxyl groups; producing a three-dimensional waterproof resilient polymer fiber-coating which is firmer and more resilient, non-tacky, heat-resistant and less thermoplastic, highly-insoluble, strongly bonded to the fibers, and highly resistant to water absorption and to softening or removal by repeated launderings and dry cleanings. Use of this type of curing agent also has the advantage that it treats the surface structure of the cellulose fibers (apparently by reacting with hydroxyl groups of the cellulose molecules to produce cross-linking and also by self-polymerizing) so as to render these fibers more resistant to water-absorption and to shrinkage. It also produces a stronger and more water-resistant bond between the cellulose fibers and the contacting acrylate polymer coatings, apparently by cross-linking. An illustrative curing agent compound of this type is dimethylol cyclic ethylene-urea, also designated as 1,3 bis (hydroxymethyl)-2-imidazolidinone, which is commercially available under the trademark "Rhonite R–1" from Rohm & Haas Company. A similar curing agent is sold under the trademark "Rhonite R–2" and is believed to comprise the same compound but in a partially polymerized form that is likewise miscible with water in all proportions.

The following steps are employed in fabricating porous shaped fabric articles (such as brassiere cups) from the foregoing materials:

(1) The three types of staple fibers are mixed and the mixture is continuously formed into a carded web by a garnett machine or the like. A "Rando-Webber" machine (sold by Curlator Corp., Rochester, N.Y.) may be used. The staple fibers are thereby randomly directed and interlaced into a loose fluffy web wherein the various types of fibers cross over and under each other so as to be held together in three dimensions in a coherent bat, being held in restraint by mechanical and frictional forces. The resultant fibrous web may be identified as a "carded web" on the basis of characteristic fibrous structure even when not literally made by a carding procedure in the strict sense. The total fiber weight per unit area is selected with reference to the particular article to be produced and the properties desired. In general, a fiber weight in the round figure range of about 100 to 200 pounds per thousand square yards (about 50 to 110 kgs. per thousand square meters) will be employed. A fiber weight of about 150 pounds per thousand square yards (about 80 kgs. per thousand square meters) has proved quite satisfactory in the manufacture of brassiere cups; the fiber mixture consisting (by weight) of 20% drawn polyester fibers (3 denier), 40% undrawn polyester fibers (7 denier), and 40% viscose-rayon fibers (3 denier); these staple fibers all having a length of 1½ inches. Preferably, the web is put through a needling type felting machine, having barbed needles spaced half an inch apart, which pushes tufts of fibers through the fibrous bat from one face to the other, thereby imparting greater coherency and absorptiveness from face to face.

(2) A dry fluffy sheet of suitable size, cut from the aforesaid carded web, is fitted over a heated male mold having the desired contour. A mold of cast aluminum, internally heated by an electric heating element, is preferred; the surface temperature being in the range of about 250 to 400° F. The fluffy web is rapidly conformed (as by hand smoothing) to an unwrinkled approximate fit, the fibers being able to shift about to make this possible without wrinkling or impairing the uniformity of the web or stretching the fibers. A sheet of conformable open-mesh net or gauze can be fitted over the fibrous web, if desired, and will be co-shaped and integrated with the surface in the subsequent operation. An example is a polyester fiber (e.g., "Dacron") net which has been knit on a Rochelle machine. During the few seconds required for this step, the undrawn polyester fibers of the fluffy web do not have time to become heated up to a soft and sticky condition, nor is there time for the web to shrink and distort, as would occur if prolonged exposure to the heated mold were permitted prior to the next step.

(3) A thin stretchy nonadhering silicone rubber blanket (mounted in a frame) is promptly brought against the web-covered mold so that a relatively uniform soft pressing action is exerted on the intervening web. The mold is located on a platform provided with holes contiguous to the mold and connected to a vacuum line. When the blanket frame contacts the platform, the suction is turned on to produce a vacuum between the blanket and the mold, so that the stretchy blanket is quickly and uniformly pressed against the web by the external atmospheric pressure, and air pockets are prevented. This results in a final and precise molding of the web to the shape of the mold, the fibers still being able to move in the initial phase of this step; and the web is simultaneously compacted by the soft pressing action. The undrawn amorphous thermoplastic polyester binder fibers now become heated sufficiently by the hot mold to fuse together at their mutual crossing points, thus becoming autogenously interbonded, and fiber stresses are relieved. The heating and pressing are insufficient to cause mashing or cutting of fibers, and fiber identity is retained. Continued heating converts the soft and sticky undrawn polyester fibers from an amorphous to a crystalline state which elevates the softening temperature to above the temperature of the mold. This change of state hardens and stiffens these fibers, renders them nonadherent to the mold, and stabilizes the unified molded web so that it will retain its shape even though still warm. Absent such change of state, the web would stick to the hot mold (unless the latter had a special antistick type of surface) and would not be set in a stable shape, and hence could not be removed from the hot mold without being distorted.

(4) The vacuum is released and the blanket is removed. The exposed molded article is grasped about its periphery and lifted from the hot mold, no intervening cooling being required. The article does not stick to the hot mold and can be easily and bodily lifted away without being distorted. This forming process can be performed successively at the rate of 2 or 3 articles per minute per mold. A single operator can handle formations on a substantial number of molds. A plurality of adjacent molds can be combined in a single production unit utilizing a single blanket, in which case a single large sheet of the carded web can be fitted over all of such molds to permit of simultaneous molding. Thus a single operator can produce two to three thousand molded brassiere cups per hour.

(5) The molded article is then saturated or impregnated by the aforesaid preferred aqueous latex dispersion (D), the concentration of the latex solids being selected so that the fibers will be sized or coated therewith but without filling the interstices; the end product on a dry basis consisting of about 50 to 75% fibers and 25 to 50% polymer coating solids, by weight. This can be conveniently and efficiently effected by positioning the article, convex side up, under a dispensing head containing small orifices or holes through which the dispersion is allowed to stream upon the article until it is thoroughly wetted and saturated. This saturation is facilitated by the wicking action of the compacted fibrous structure. The dribbling on of the dispersion in this way does not collapse or distort the article, which has sufficient stiffness to resist the moderate forces involved. The previously unified network of interlaced cross-bonded fibers, immobilizes the fibers of the structure so as to inhibit movement during this step. The dispensing head is connected to a supply vessel at a higher level so that gravity feed controls the rate and force of flow in the desired manner. This and the following steps can be performed on an automatic production line basis, a series of articles being continuously moved along by a conveyor system.

(6) The wet saturated article is then subjected to heating with hot air to successively dry the article and cure the polymer size coatings, the fibers not being raised to a temperature that causes softening or melting. In continuous production the series of articles is conveyed through an oven having circulating hot air which provides heat for drying and curing, and which also carries away the evaporated moisture and any volatiles liberated by the curing reaction. (Thus formaldehyde is liberated by the aforesaid cyclic urea-formaldehyde curing agent.) The structure of the article prevents it from becoming distorted during this final drying and unification procedure. It is now in a strong and tough condition and can stand rough handling.

(7) The article can now be given various finishing treatments as desired; such as washing, bleaching, rinsing, and drying, and trimming. These are all performed in manufacturing brassiere cups so as to eliminate any traces of soluble contaminants and of discoloration resulting from the coating treatment, and to obtain cups of precise desired size which need no further trimming by the manufacturer of the ultimate complete brassiere products.

The finished articles are highly porous. Thus a product having a fiber weight of about 150 pounds per thousand square yards and containing about 40% by weight of polymer fiber-sizing solids, will be several hundred times as porous to air as absorbent paper towelling. This permits of ready transpiration of air and moisture, i.e., "breathability". Water and perspiration are readily absorbed into the capillary structure (existing between the sized fibers) when it flexes or rubs. But the coated fibers themselves are not water-absorptive and in fact are water-repellent as shown by the fact that a drop of water placed on the surface (without flexing or rubbing) does not spread out or wet the surface. During laundering, the flexing and rubbing causes the soapy or detergent-containing water, and the rinse water, to thoroughly penetrate into and through the fabric structure so as to fully contact the individual coated fibrous surfaces, and with greater ease and completeness than is possible in the case of woven or knitted fabrics, thereby achieving a high degree of cleansing. The wet article dries rapidly. The polymer fiber coatings are highly resistant to laundering and this permits of many washings of the article without adverse effect.

Examples of shaped articles of wearing apparel other than brassiere cups that can be manufactured to advantage in accordance with this invention, are: contoured shoulder pads and hip forms, employed in clothing; hat and cap crowns; slippers; tennis shoe uppers; and porous breath-filtering face masks used by surgeons, physicians, dentists, nurses, and by industrial workers subjected to dusty or contaminated atmospheres.

In making articles that will not be subjected to washing or dry-cleaning by the user, as in the case of face masks intended to be discarded after use, it is not necessary to employ a fiber-sizing latex that is resistant to washing or dry-cleaning. In such cases the fiber-binding size need only impart body, toughness and strength so that the article can be handled and used and will retain its body and shape. Various acrylic latex dispersions, for example, are available for such usage.

Single ply carded webs can be employed for many articles, such as brassiere cups and face masks. Where greater stiffness and strength is needed, two or three plies can be lapped together to obtain the desired weight per unit area in the molded product. The plies may differ in fiber composition and need not all have the particular type of fiber mixture previously described. For instance, a three-ply web can be utilized wherein the inner ply consists of fibers selected to produce greater stiffness both of the intermediate molded product and the final article; as in the manufacture of hat crowns and shoe uppers which are of such size or complexity of shape that distortion would otherwise result upon impregnating the molded article with the aqueous latex dispersion and subsequent drying. In the latter case it has been found that a three-ply carded web having outer plies similar to the web previously described for use in making brassiere cups, and an inner ply consisting of carded staple fibers of thermoplastic polyvinyl chloride (e.g., "Vinyon" staple fibers sold by American Viscose Corp.) or a mixure thereof with rayon fibers, is quite satisfactory. During the molding step, the polyvinyl chloride fibers fuse into the fibrous structure and render the product stiffer though still flexible.

*Example*

A preferred utilization of the aforesaid materials and process steps in the manufacture of brassiere cups involves the following details:

A single ply carded fiber web is utilized that is composed, by weight, of 20% of "Dacron" drawn polyester fibers (3 denier), 40% of undrawn polyester fibers (7 denier) having the same chemical composition as the drawn fibers, and 40% of viscose-rayon fibers (3 denier); these staple fibers all having a length of 1½ inches. The total fiber weight is about 150 pounds per thousand square yards (about 80 kgs. per thousand square meters). The bat is needled on a needling type felting machine whose barbed needles are spaced one-half inch apart so as to push through tufts from top to bottom at half-inch spaced points over the entire area.

Aluminum male molds are employed which are internally heated to maintain a surface temperature of about 350° F. The total contact interval during molding is about 20 seconds; the web contacting the mold for about 3 seconds before the blanket is applied and the blanket pressing against the web for about 15 seconds before removal. Evacuation of air under the blanket takes only a few seconds, so the blanket is pressed against the web at substantially atmospheric pressure during most of this period. The undrawn polyester fibers are converted from an amorphous to a crystalline state about 5 seconds after having become heated to the mold temperature.

The fiber-sizing latex dispersion consists (by weight) of twenty parts of the aforesaid "HA-1" acrylate polymer latex dispersion (containing 46% by weight of polymer solids) and one part of the aforesaid "Rhonite R-2" curing agent, with sufficient water added to adjust the solids content of the aqueous mixture to about 15%, such that the fabric product will contain about 40% by weight of the cured polymer on a dry basis. The wet saturated molded cups are heated in a circulating hot air oven for 9 to 10 minutes for drying and for 2 to 3 minutes for curing, the air temperature being about 300° F.

The semi-finished cups are then thoroughly washed, rinsed, bleached in perborate solution, rinsed, and dried. A large number of the cups can be trimmed at the same time by stacking on a male mold, capping with a female mold, and trimming with a power knife around the perimeter of the molds. These finished cups are then ready for sewing into the harnesses of brassieres.

The present process in its broader aspects has utility for manufacturing shaped articles even though the particular type of fiber mixture combination previously described in connection with the manufacture of brassiere cups may not be used. The important point is that the carded fibrous web used for molding is formed of a mixture of staple fibers having a length of one to two inches, including 30 to 50% by weight of the unplasticized undrawn polyester binder fibers and the balance consisting of structural fibers which remain hard and nontacky in the thermosoftening range of these undrawn polyester fibers. The unique virtue of the undrawn polyester fibers is that they readily fuse together at their crossing points without loss of fiber identity and then, upon continued heating during the molding operation, they become crystalline and harden and stiffen, and lose their tackiness so that there is no adherence to the mold, thereby resulting in a unified shape-retaining article that can be lifted from the mold without cooling and without distortion of shape. This feature permits of high-speed production of molded articles having a highly uniform predetermined shape.

We claim:

1. A process of manufacturing a nonwoven porous seamless shaped fabric wearing apparel article of the character described which comprises the steps of: (1) forming a carded fibrous web of a mixture of staple fibers having a length of one to two inches and consisting essentially of unplasticized drawn polyester fibers, unplasticized undrawn amorphous polyester fibers serving as thermoplastic binder fibers, and cellulose fibers, the undrawn polyester fibers being in the proportion of 30 to 50% and the drawn polyester fibers being in the proportion of 10 to 30% by weight of the fiber mixture; (2) shaping a fluffy dry sheet of said carded fibrous web over a heated male mold maintained at a temperature in the range of about 250 to 400° F.; (3) promptly subjecting the dry sheet to uniform soft-pressing against the heated mold to compact and unify it into a stable molded shape precisely conforming to the mold, the undrawn polyester fibers becoming fused together at their mutual crossing points and being then rendered crystalline and nonadherent to the mold to provide a fiber-unifying and shape-retaining network; (4) promptly removing the molded fibrous sheet from the heated mold without impairing its shape; (5) impregnating the molded fibrous sheet without impairing its shape with an aqueous sizing dispersion of a carboxylic acrylate latex including a curing agent, so as to coat and interbond all the fibers with a latex binder in a dryweight proportion of 25 to 50% of the combined weight; (6) heating the impregnated article with hot air to dry it and to cure the polymer fiber coatings; so as to obtain a molded article that is highly porous, strong and tough, shape-retaining but flexible, nonirritating to the skin, and capable of repeated laundering.

2. A process of manufacturing a nonwoven porous seamless shaped article which comprises the steps of: forming a carded fibrous web of a mixture of staple fibers having a length of one to two inches, including 30 to 50% by weight of unplasticized undrawn thermoplastic amorphous polyester binder fibers and the balance consisting of structural fibers which remain hard and nontacky in the thermosoftening range of said undrawn polyester fibers; shaping a fluffy dry sheet of said carded fibrous web over a heated male mold maintained at a temperature in the thermosoftening range of said undrawn polyester fibers; promptly subjecting the dry sheet to uniform soft-pressing against the heated mold to compact and unify it into a stable molded shape precisely conforming to the mold, the undrawn polyester fibers becoming fused together at the mutual crossing points and being then rendered crystalline and nonadherent to the mold to provide a fiber-unifying and shape-retaining network; promptly removing the molded fibrous sheet from the heated mold without impairing its shape; impregnating the molded fibrous sheet without impairing its shape with an aqueous dispersion of a fiber-binder size and drying the sheet so as to provide an undistorted porous molded article having the fiber interbonded by said size.

3. A process of manufacturing a nonwoven porous seamless shaped fabric article of the character described which comprises the steps of: (1) forming a carded fibrous web of a mixture of staple fibers having a length of one to two inches and consisting essentially of unplasticized drawn polyester fibers, unplasticized undrawn amorphous polyester fibers serving as thermoplastic binder fibers, and cellulose fibers, the undrawn polyester fibers being in the proportion of 30 to 50% and the drawn polyester fibers being in the proportion of 10 to 30% by weight of the fiber mixture; (2) shaping a fluffy dry sheet of said carded fibrous web over a heated male mold maintained at a temperature in the range of about 250 to 400° F.; (3) promptly subjecting the dry sheet to uniform soft-pressing against the heated mold to compact and unify it into a stable molded shape precisely conforming to the mold, the undrawn polyester fibers becoming fused together at their mutual crossing points and being then rendered crystalline and nonadherent to the mold to provide a fiber-unifying and shape-retaining network; (4) promptly removing the molded fibrous sheet from the heated mold without impairing its shape; (5) impregnating the molded fibrous sheet without impairing its shape with an aqueous dispersion of a fiber-binder size; (6) drying the sheet; so as to provide an undistorted porous molded article having the fibers interbonded by said size.

4. A nonwoven porous seamless shaped fabric wearing apparel article of the character described, which has been made by the process of claim 1.

5. A seamless brassiere cup which has been made by the process of claim 1.

6. A brassiere characterized by having a pair of seamless cups which have been made by the process of claim 1.

7. A seamless shaped article made by the process of claim 2.

8. A seamless shaped article made by the process of claim 3.

References Cited in the file of this patent

UNITED STATES PATENTS

| | | |
|---|---|---|
| 2,190,807 | Steinberger | Feb. 20, 1940 |
| 2,285,967 | Hardy | June 9, 1942 |
| 2,373,954 | Frankfurther | Apr. 17, 1945 |
| 2,459,804 | Francis | Jan. 25, 1949 |
| 2,609,539 | Shearer | Sept. 9, 1952 |
| 2,686,312 | Schmidt | Aug. 17, 1954 |
| 2,760,198 | Poole et al. | Aug. 28, 1956 |